A. A. EWALD.
HOSE COUPLING.
APPLICATION FILED NOV. 7, 1919.

1,367,246.

Patented Feb. 1, 1921.

Witness

Inventor
Arno A. Ewald
By
Attorneys

UNITED STATES PATENT OFFICE.

ARNO ARTHUR EWALD, OF OAKFIELD, WISCONSIN.

HOSE-COUPLING.

1,367,246.	Specification of Letters Patent.	Patented Feb. 1, 1921.

Application filed November 7, 1919. Serial No. 336,269.

*To all whom it may concern:*

Be it known that I, ARNO A. EWALD, a citizen of the United States, residing at Oakfield, in the county of Fond du Lac and State of Wisconsin, have invented certain new and useful Improvements in Hose-Couplings; and I do declare the following to be a full, clear, and exact description of the invention, such as will enable others skilled in the art to which it appertains to make and use the same.

My invention relates to hose couplings and more particularly to those intended for quickly and easily attaching numerous standard sizes of hose to blow guns and tire inflating apparatus, although the invention is not restricted to any particular field.

One object of the invention is to provide a simple and inexpensive coupling which may be used for numerous sizes of hose and which embodies a coiled hose protector, together with one or more bushings for holding said protector in place as well as adapting the coupling to hoses of different sizes. A further object is to provide the outer end of the coiled protector with convolutions of different sizes, one or more of the smaller convolutions being adapted to be cut from the protector when hoses of greater diameter than said convolutions are to be used.

With the foregoing in view, the invention resides in the novel construction and arrangement of parts hereinafter fully described and claimed, and shown in the accompanying drawing.

Figure 1:
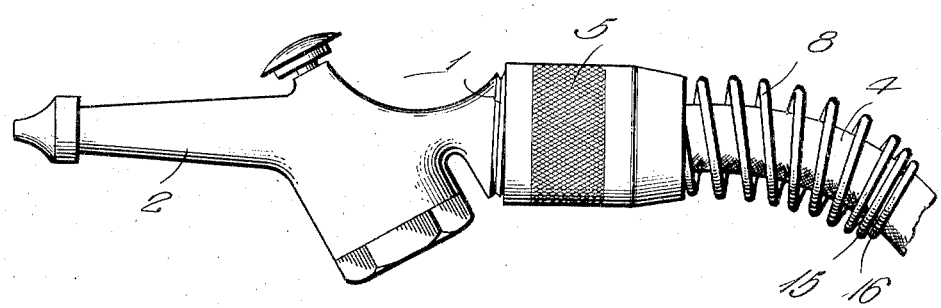
Figure 1 is a side elevation of one of the couplings in use for attaching a hose to a blow gun.

In carrying out my invention, I provide a cylindrical body such as that indicated at 1 in the drawing. One end of this body may be integral with or otherwise suitably connected to a blow gun or other device 2, while the opposite end of said body is provided with a cone 3 adapted for reception in hoses of numerous standard diameters, a comparatively small hose being illustrated at 4.

Figure 2:
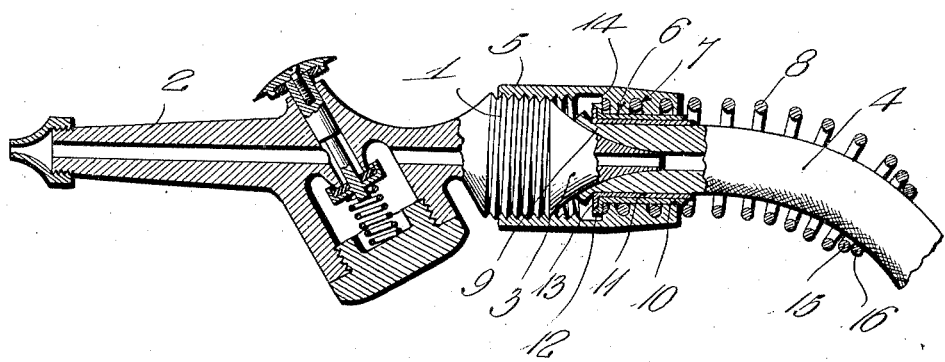
Fig. 2 is a longitudinal section of the parts shown in Fig. 1, partly in elevation.

A sleeve 5 is threaded at one end upon the cylindrical body 1, while the other end of said sleeve has its internal diameter decreased as indicated at 6, said last named end of the sleeve 5 being provided with coarse internal threads 7 with which a coiled hose protector 8 is engaged as seen clearly in Fig. 2. Suitable bushing means surrounds the hose 4 within the inner end of the protector 8 and serves both to retain said protector in engagement with the threads and to clamp the expanded inner end 9 of the hose upon the cone 3. In the present showing, I have illustrated a relatively large bushing 10 and a smaller bushing 11 within the same, said bushings having at their inner ends outstanding shoulders 12 and 13 respectively. The shoulder 13 of the small bushing 11 abuts the inner end of the relatively large bushing 10, while the shoulder 12 of the latter bears against the annular shoulder 14 which is formed at the juncture of the two internal diameters of the sleeve 5.

When a rather small hose is to be coupled, both bushings are used as seen in Fig. 2, the outer bushing then serving to hold the protector 8 in engagement with the threads 7, while the inner bushing abuts the expanded end 9 of the hose 4 and tightly clamps it against the cone 3, when the sleeve 5 is threaded tightly in place. When a larger hose is to be used, the inner bushing 11 may be removed, in which case the larger bushing 10 would both retain the protector 8 in place and clamp the hose.

The outer end of the protector is decreased in size to rather snugly surround the hose and this reduction is accomplished by forming the last two convolutions 15 and 16 of smaller size than the remaining coils, the convolution 16 being in turn smaller than the one designated at 15. When a rather small hose is being coupled, it is passed through the convolution or coil 16 and both bushings 10 and 11 are used as seen in Fig. 2. When a larger hose is used, the coil 16 is cut from the protector 8 and the convolution 15 then embraces said hose, only the bushing 10 being now used, due to the larger hose diameter. When an especially large hose is employed, both bushings are eliminated and both coils 15 and 16 are cut from the protector, and if a large metal wrapped hose is used, both bushings and the protector may be eliminated. With all hose however except those covered by metal, the protector is employed to prevent cracking adjacent the coupling.

From the foregoing, taken in connection with the accompanying drawing, it will be seen that I have provided an extremely simple and inexpensive, yet a highly efficient and in every way desirable coupling, and in actual practice I have found that any hose of the standard sizes commonly used, may be securely clamped in place by the device. Since probably the best results may be obtained from the exact details shown, they may be followed, but within the scope of the invention as claimed, the device is subject to numerous minor changes, and may be used with numerous kinds of machines and apparatus.

I claim:

1. A hose coupling comprising a cylindrical body having a cone at one end for reception in the end of a hose, a sleeve threaded at one end on said body and internally reduced in diameter at its other end, the juncture of the two diameters forming an annular shoulder, the reduced end of said sleeve having coarse internal threads, a coiled protector adapted to surround the base, said protector being engaged with said coarse internal threads, and bushing means adapted to surround the hose, said bushing means being within said protector and retaining the latter in engagement with said threads, the inner end of said bushing means being adapted to abut the hose and having an external shoulder abutting said first named shoulder.

2. A structure as specified in claim 1, the outer end of said coiled protector having a reduced convolution whose internal diameter is substantially the same as that of said bushing means, said convolution being adapted to be cut from the protector when using a relatively large hose.

3. A hose coupling adaptable for hose of different external diameters, and a coiled protector extending from said coupling to surround the hose; said protector having convolutions of gradually reducing diameters, the smallest one of which is located at the outer end of said protector, one or more of said convolutions being adapted to be cut from the protector when hose larger than the internal diameter of the convolution or convolutions are used.

4. A hose coupling comprising a cylindrical body having a cone at one end for reception in the end of a hose, a sleeve threaded at one end on said body and internally reduced in diameter at its other end, the juncture of the two diameters forming an annular shoulder, the reduced end of said sleeve having coarse internal threads, a coiled hose protector one of whose ends is adapted to engage said coarse internal threads, a comparatively large bushing adapted for disposition within said first named end of the coil to retain the latter in engagement with said threads and adapted also to bear against a relatively large hose when the latter is expanded around the aforesaid cone, said bushing having a shoulder to abut the shoulder of said sleeve, and a relatively small bushing for reception in said comparatively large bushing when a smaller hose is used; the outer end of said coiled protector being reduced and having its last convolutions of the same internal diameters as said relatively small and large bushings, respectively, the smaller convolution being adapted to be cut from the protector when only the relatively large bushing is to be used, and both convolutions being adapted to be so removed when a large hose requiring no bushing is employed.

In testimony whereof I have hereunto set my hand.

ARNO ARTHUR EWALD.